United States Patent
Morganson et al.

(10) Patent No.: US 11,878,470 B2
(45) Date of Patent: Jan. 23, 2024

(54) HIGH AMPLITUDE PNEUMATIC IMPACT FOR POWDER REMOVAL IN ADDITIVE MANUFACTURING

(71) Applicant: Hamilton Sundstrand Corporation, Charlotte, NC (US)

(72) Inventors: David W. Morganson, Marlborough, CT (US); Tommy Skiba, East Hartford, CT (US); Brendan Gustafson, Vernon, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 17/686,925

(22) Filed: Mar. 4, 2022

(65) Prior Publication Data

US 2023/0278287 A1 Sep. 7, 2023

(51) Int. Cl.
*B29C 64/35* (2017.01)
*B33Y 30/00* (2015.01)
*B29C 64/245* (2017.01)
*B33Y 40/00* (2020.01)
*B29C 64/241* (2017.01)

(52) U.S. Cl.
CPC .......... *B29C 64/35* (2017.08); *B29C 64/241* (2017.08); *B29C 64/245* (2017.08); *B33Y 30/00* (2014.12); *B33Y 40/00* (2014.12)

(58) Field of Classification Search
CPC ..... B29C 64/35; B29C 64/245; B29C 64/241; B33Y 30/00; B33Y 40/00
See application file for complete search history.

(56) References Cited

U.S. PATENT DOCUMENTS

| 10,189,057 B2 | 1/2019 | Craft et al. |
| 10,737,363 B2 | 8/2020 | Ott et al. |
| 11,148,368 B2 | 10/2021 | Lebed |
| 2018/0009007 A1* | 1/2018 | Craft ............. B08B 7/026 |
| 2020/0376786 A1 | 12/2020 | Morganson et al. |
| 2021/0170491 A1 | 6/2021 | Lebed |

FOREIGN PATENT DOCUMENTS

| CN | 112046004 A | 12/2020 |
| EP | 3533538 A1 | 9/2019 |
| EP | 3536424 A1 | 9/2019 |
| EP | 4066950 A1 | 10/2022 |
| WO | 2017017274 A1 | 2/2017 |

OTHER PUBLICATIONS

Extended European Search Report for EP Application No. 23159973.9, dated Jul. 14, 2023, 8 pages.

* cited by examiner

*Primary Examiner* — Joseph S Del Sole
*Assistant Examiner* — John Robitaille
(74) *Attorney, Agent, or Firm* — Kinney & Lange, P.A.

(57) ABSTRACT

A powder removal fixture includes a mounting arm extending along and rotatable about a mounting arm axis, at least one pneumatic knocker mounted to the mounting arm via a strike plate, and configured to impact the strike plate, and a build plate attachment mechanism disposed on the mount bar, and configured to receive a build plate having an at least partially formed component.

20 Claims, 5 Drawing Sheets

HIGH AMPLITUDE PNEUMATIC IMPACT FOR POWDER REMOVAL IN ADDITIVE MANUFACTURING

BACKGROUND

The disclosed subject matter relates generally to additive manufacturing and, more particularly, to the removal of powder from additively manufactured components.

After building a part using a powder-based additive manufacturing process, unfused powder must be removed from the part and from the build platform. Removal of powder, especially from complexly shaped components, can be challenging. Existing techniques such as vibration, applying a stream of gas, and delivering manual blows to the build platform are considered satisfactory for their intended purpose. However, a need exists for improved techniques capable of high-yield powder removal from complex components.

SUMMARY

A powder removal fixture includes a mounting arm extending along and rotatable about a mounting arm axis, at least one pneumatic knocker mounted to the mounting arm via a strike plate, and configured to impact the strike plate, and a build plate attachment mechanism disposed on the mount bar, and configured to receive a build plate having an at least partially formed component.

A method of removing loose powder from an additively manufactured component includes attaching a build plate to a mounting arm of a powder removal fixture, the build plate including a build surface with the component formed on the build surface, rotating the mounting arm from a first position to a second position about a mounting arm axis, and impacting a strike plate mounted on the mounting arm with a piston of a pneumatic knocker when the mounting arm is in the second position to dislodge an amount of the loose powder from the component.

Figure 1:
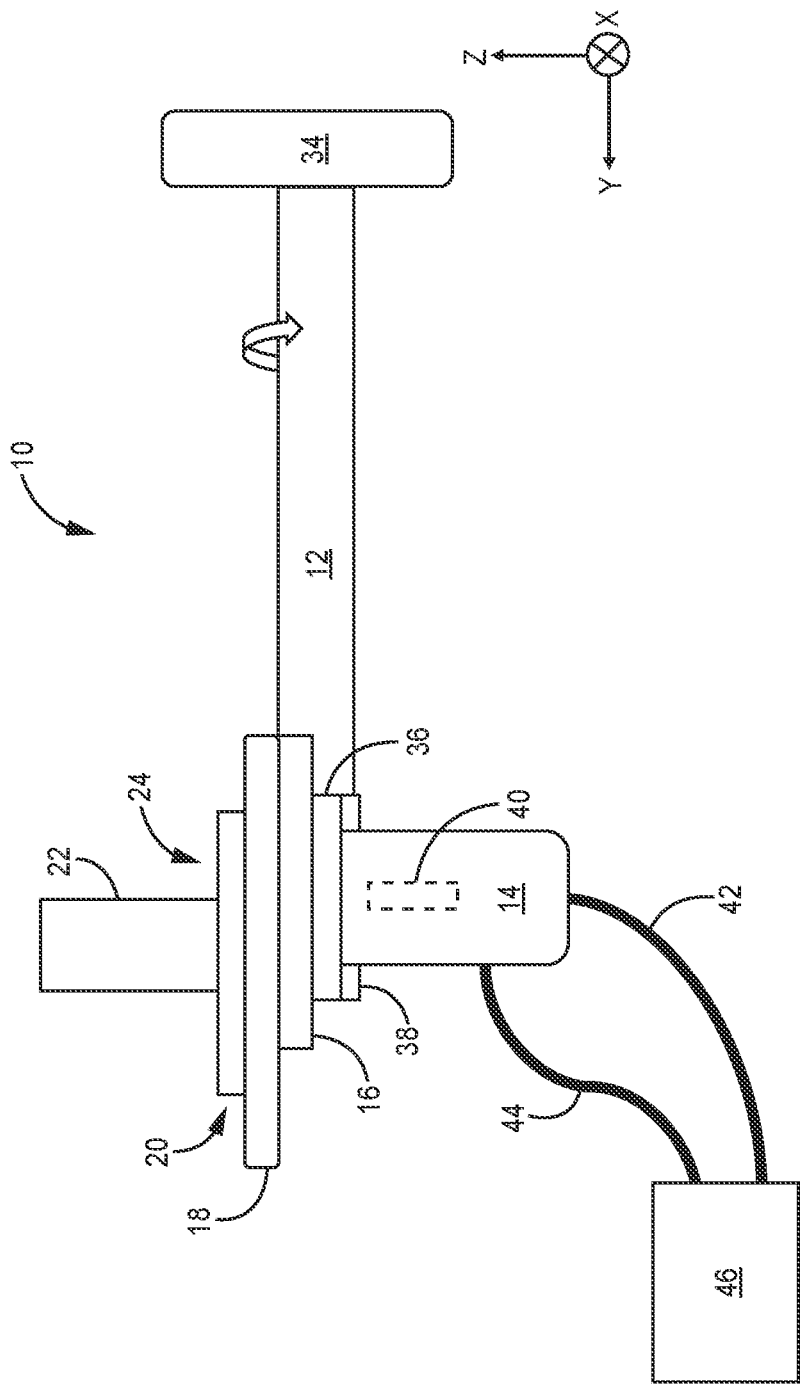
FIG. 1 is a simplified side view of a powder removal fixture in a first position, with the build plate and component facing up.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a device and method for removing loose (e.g., excess, unfused, etc.) powder from a build plate and component after additively manufacturing the component. The build plate and component are mounted to a powder removal fixture. As mounted, the build plate is rotatable about at least one axis of the fixture such that the build plate is invertible. A pneumatic knocker is mounted near the build plate and strikes a strike plate at a desired frequency and intensity once the build plate is inverted. The gravitational force and resonance generated in the build plate by the knocker causes loose powder to fall from the build plate and from within the component.

Figure 2:
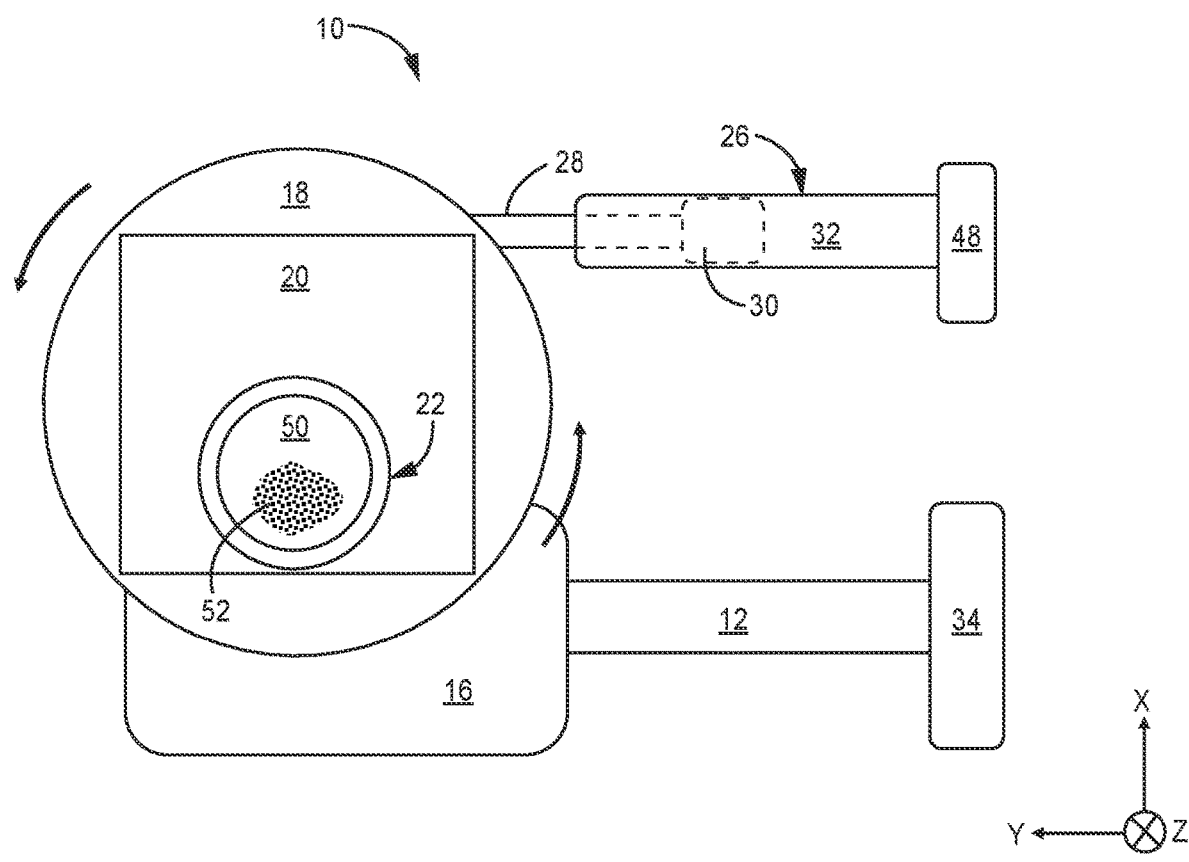
FIG. 2 is a simplified top view of the powder removal fixture in the first position.

FIG. 1 is a simplified side view (i.e., showing the y-z plane) of powder removal fixture 10, according to one embodiment. As shown, fixture 10 is in a first, upward facing position, based on the orientation of FIG. 1 with respect to the z-axis. In FIG. 1 and elsewhere herein, terms such as "upward", "up", "upper", "top", and "above", or "downward", "down", "lower", "bottom", and "below" can be used interchangeably. FIG. 2 is a simplified top view (i.e., showing the x-y plane) of fixture 10 in the first position. FIGS. 1 and 2 will be discussed together.

Fixture 10 includes mounting arm 12, with pneumatic knocker 14 mounted to mounting arm 12 via strike plate 16. Panel 34 serves as an anchor for mounting arm 12. Tray 18 is further mounted to mounting arm 12, and is configured to receive build plate 20 with component 22 formed on build surface 24 of build plate 20. Accordingly, the top-down stacking order of mounted components in the first position of fixture 10 is as follows: component 22 is formed on build surface 24 of build plate 20 and build plate 20 is mounted on tray 18. On an opposite side of tray 18 is at least a portion of strike plate 16, which attaches to flange 36 of pneumatic knocker 14. Visible only in FIG. 2, fixture 10 further includes reciprocating arm 26, shown here as a rod and piston arrangement. More specifically, rod 28 is attachable at one end to tray 18. A portion of rod 28 and cylinder 30 are represented by dashed lines as internal to housing 32.

In the embodiment of FIGS. 1 and 2, mounting arm 12 is arranged as a cantilever, mounted to panel 34 at one end, with pneumatic knocker 14 and tray 18 mounted to an opposing end. Mounting arm 12 can be rotatable roughly 310° about its longitudinal axis (i.e., the y-axis) for the purpose of inverting build plate 20. Mounting arm 12 can rotate in either direction, that is, in the direction indicated by the arrow, or the opposite direction without departing from the scope of the invention. Panel 34 can be fixed (i.e., not rotatable) with respect to mounting arm 12, and can act as an interface for the driver of the rotation. In an exemplary embodiment, an electrically driven motor (not shown) drives the rotation of mounting arm 12. In an alternative embodiment, mounting arm 12 can be manually rotated. When not actively being rotated, a motorized mounting arm 12 is held stationary (i.e., locked) about its rotational axis by the motor.

Strike plate 16 can be removably mounted to mounting arm 12 via any suitable attachment means (e.g., threaded fasteners, clamps, etc.). Pneumatic knocker 14 is mounted to mount plate 12 via its attachment to strike plate 16 by mounting flange 36 and bolts 38. Pneumatic knocker 14 includes piston 40, shown internally with dashed lines configured to move up and down, as labeled in FIG. 1, to impact strike plate 16. Pneumatic knocker 14 receives compressed air via inlet line 42 to operate piston 40. Exhaust line 44 carries exhaust air from pneumatic knocker 14. Each of inlet line 42 and exhaust line 44 can be fluidly connected to spool valve 46, which fluidly connects inlet line 42 to a source (not shown) of compressed air, and exhaust line 44 to an exhaust port.

Like strike plate 16, tray 18 is mounted to mounting arm 12 via any suitable attachment means. Build plate 20 can be removably mounted to tray 18 via similar attachment means. Tray 18 is rotatable 360° about a tray rotational axis (i.e., z-axis) for the purpose of positioning component 22 over (or away from) strike plate 16, as desired. Although shown rotatable in the counterclockwise direction, tray 18 could be rotatable in the clockwise direction without departing from the scope of the invention. Additionally, tray 18 and/or build plate 20 can have other geometries, besides circular and square, respectively, without departing from the scope of the invention.

Rod 28 of reciprocating arm 26 rotates tray 18 by the back-and-forth movement of cylinder 30 within housing 32 along the longitudinal axis of reciprocating arm 26 (i.e., the y-axis). Other means for mechanically rotating tray 18 are contemplated herein. Reciprocating arm can be a cantilever structure, like mounting arm 12, and attached to bracket 48. In an alternative embodiment, it can be attached to a base or other structure, depending on factors such as the type of reciprocating arm and spatial constrains of fixture 10.

Prior to its attachment to fixture 12, component 22 is formed on base 20 using a powder-based additive manufacturing process, such as laser powder bed fusion (LPBF). As shown in FIGS. 1 and 2, component 22 is a hollow cylinder with inner cavity 50. During the additive manufacturing process, feedstock powder is fused together in a layer-by-layer fashion. Commonly, an amount of unfused powder (i.e., loose powder 52) can remain within cavity 50 and/or build surface 24 of build plate 20. It is possible that component 22 is only partially complete, for example, if the geometry is particularly complex requiring a multi-stage powder removal throughout the build process. Although shown as a hollow cylinder, component 22 can have alternative and/or additional geometries such as various curves, internal threading, labyrinth channels, overhanging surfaces, etc.

Figure 3:
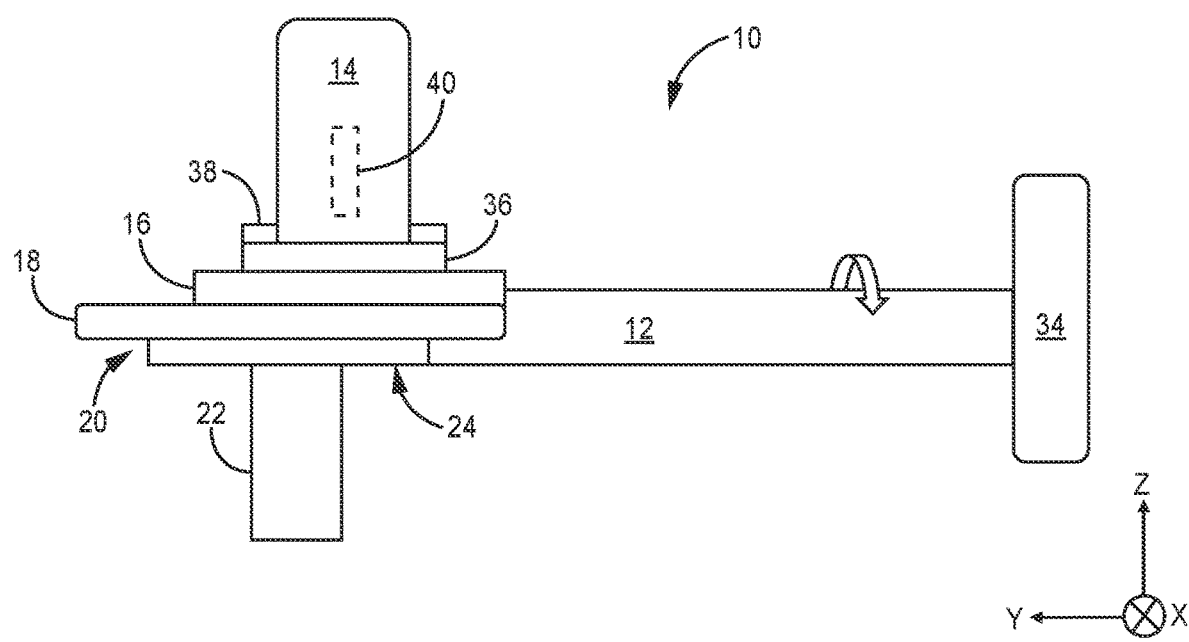
FIG. 3 is a simplified side view of the powder removal fixture in a second position, with the build plate and component facing down.

FIG. 3 is a simplified side view of powder removal fixture 10 in a second, downward facing position, based on the orientation of FIG. 3 with respect to the z-axis. Fixture 10 is shown for simplicity without inlet line 42, exhaust line 44, and spool valve 46. As shown, mounting arm 12 and attached components are rotated roughly 180° from the start position such that component 22 is inverted with inner cavity 50 open and downward facing. In this position, the removal of loose powder 52 can be aided by gravity. Mounting arm 12 can be held in the second position by any suitable locking mechanism in communication, for example, with panel 34 or directly with mounting arm 12.

Mounting arm 12 can be rotated roughly 310° in either direction and locked in place at any rotational position. As such, the second position, as described, can be anywhere between the start position and 180° (in either direction). For example, in an alternative embodiment, component 22 could have an internal cavity 50 open in the direction of the x-axis in the start position, thus, it may be desirable to rotate mounting arm 90° at which point, internal cavity 50 would be facing down. It is further possible to rotate and lock mounting arm 12 at various positions (e.g., 45°, 90°, 180°, etc.) during the powder removal process, which is discussed in greater detail below.

Figure 4:
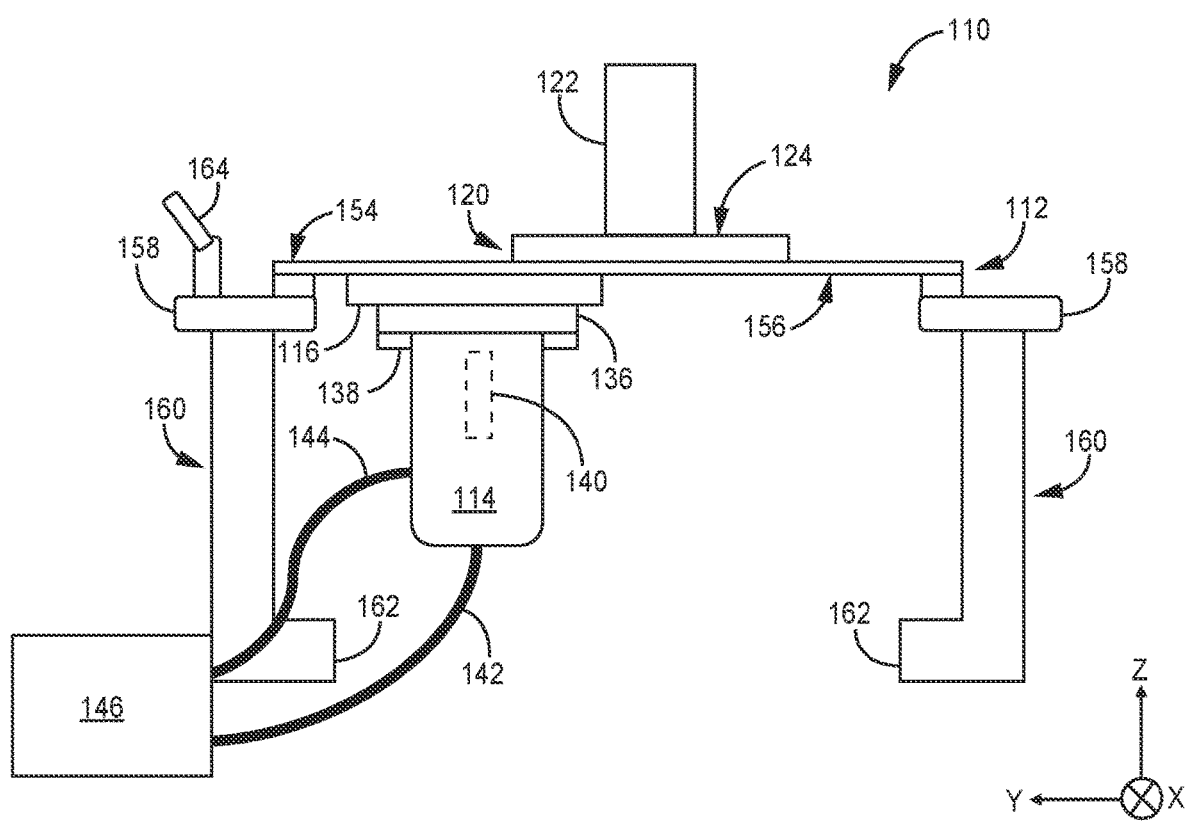
FIG. 4 is a simplified side view of an alternative powder removal fixture in a first position, with the build plate and component facing up.

FIG. 4 is a simplified side view of alternative powder removal fixture 110, shown in a first, upward facing position. As with fixture 10, the first position of fixture 110 corresponds to the orientation of build plate 120 and component 122. The components of fixture 110 are substantially similar to analogous components of fixture 10, with the exceptions discussed below. Fixture 110 includes mounting arm 112 with build plate 120 mounted to first surface 154 of mounting arm 112, and strike plate 116 mounted to an opposite, second surface 156 of mounting arm 112. Component 122 is formed on build surface 124 of build plate 120. Mounting arm 112 is attached at its opposing ends to rotational elements 158. Each rotational element 158 is attached to a leg 160, and each leg includes a foot 162 to support fixture 110. An alternative embodiment can include a shared base rather than individual feet 162, or multiple feet 162 per leg 160 without departing from the scope of the invention. Rotational elements 158 can be cylindrical or rounded elements permitting the rotation of mounting arm 112 310° about its longitudinal axis (i.e., the y axis). Rotation and locking of mounting arm 112 can be accomplished using locking handle 164, shown only on one rotational element 158, although a locking handle 164 can be placed on each rotational element 158, if desired. In the embodiment of FIG. 4, build plate 120 is directly mounted to mounting arm 112, rather than being placed in a rotatable tray. Strike plate 116 is mounted slightly offset, with respect to the y-axis, from build plate 120.

In an alternative embodiment of fixture 110, a second pneumatic knocker 114 can be mounted to second surface 156 of mounting arm 112, for example, on the other (right) side build plate 120. Such arrangement may be desirable where the area of build plate 120 is relatively large (e.g., twice as large as a for a single knocker embodiment) and/or contains multiple components 122. In such an embodiment, the impact force from each pneumatic knocker 114 can affect the portion of build plate 120 and component(s) 122 nearest the respective pneumatic knocker 114.

Figure 5:
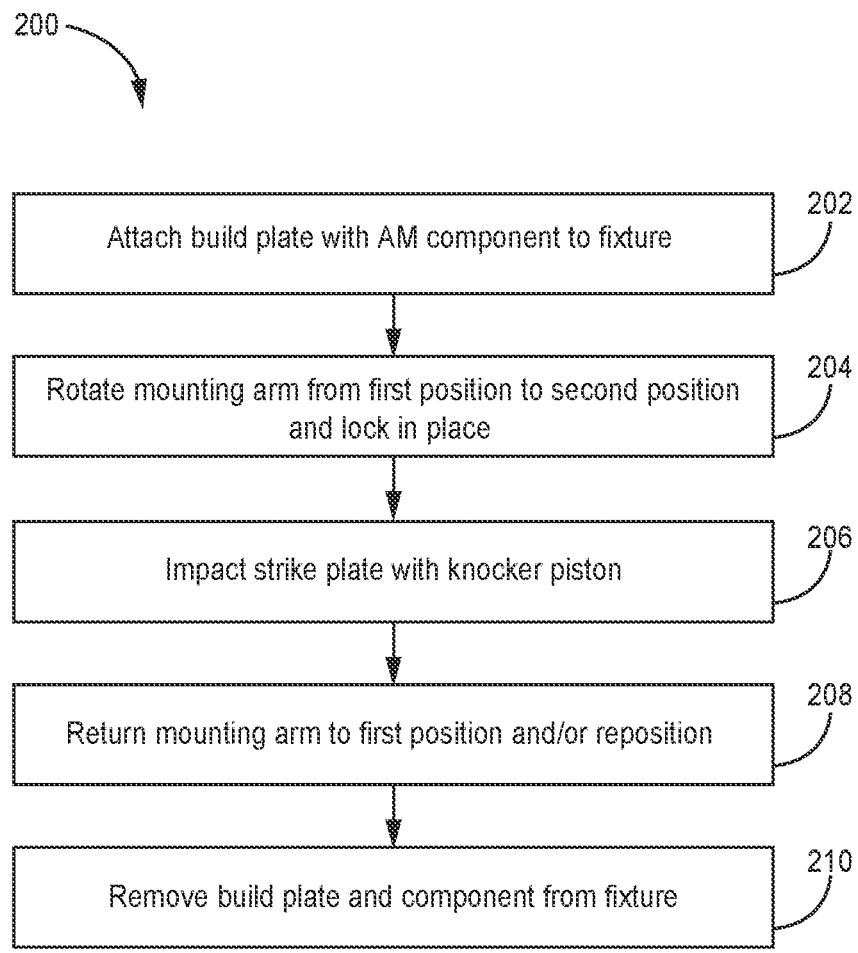
FIG. 5 is a flowchart illustrating a method of removing loose powder from a component using either embodiment of the powder removal fixture.

FIG. 5 is a flow chart illustrating method 200 for removing loose powder from an additively manufactured component. At step 202, build plate 20, 120 with respective component 22, 122 can be mounted to fixture 10, 110. Typically, build plate 20, 120 is mounted while fixture 10, 110 is in the first position. Without the build plate attached, the first position can refer to the position of pneumatic knocker 14, 114, which extends from strike plate 16, 116 toward the ground. In the case of fixture 10, build plate 20 is mounted to tray 18, while build plate 120 is directly mounted to mounting arm 112. Step 202 can further include mounting build plate 20, 120 such that component 22, 122 is at a desired position with respect to strike plate 16, 116. For build plate 20, this positioning can occur through the rotation of tray 18 about the z-axis, while build plate 120 should be mounted with the desired orientation as it is fixed in place.

At step 204, mounting arm 12, 112, is rotated from the first position to the second position. As discussed above, the second position can be 180° from the first position, or at any point along the 310° rotational axis of mounting arm 12, 112. The particular angle can be selected to optimize powder removal/detachment from component 22, for example, by selecting an angle at which the gravitational force is generally normal to a collecting surface (i.e., a surface having loose powder). Method 200 can include the use of additional positions, up to the $n^{th}$ position, as desired. Once in the second position, mounting arm 12, 112 can be locked in place such that the orientation of build plate 20 and component 22, relative to gravity, are held in place during resonance is generated in 206.

At step 206, pneumatic knocker 14, 114 is operated such that piston 40, 140 impacts strike plate 16, 116, at least once, and most commonly, multiple times to dislodge any loose powder from component 22, 122. In an exemplary embodiment, pneumatic knocker 14, 114 can be operated at 80 PSI (551.6 kPa) to impact strike plate 16, 116 with a force of 172 ft-lb (233.2 J). In general, pressures ranging from 20 PSI (137.9 kPa) to 125 PSI (861.8 kPa) to generate an impact force of a minimum of 100 ft-lb (135.6 J), up 172 ft-lb (233.2 J) are contemplated herein. The resonance in build plate 20, 120 and component 22, 122 created by repetitive impacts to the oppositely disposed and at least partially overlapping strike plate 16, 116 help dislodge loose powder (and/or clumps of loose powder) from internal cavities (e.g., walls, channels, etc.) of component 22, 122. Pneumatic knocker 14, 114 can be operated such that the impact frequency can vary from a single to a few impacts over a period of minutes, in short bursts over five to 30 seconds, or at regular intervals (e.g., once every five seconds) over one to two minutes, to name a few non-limiting examples. In an embodiment with multiple pneumatic knockers 14, 114, each pneumatic knocker 14, 114 can be operated in unison, or in an alternating fashion with the other pneumatic knockers 14, 114.

At step 208, and once a satisfactory amount of loose powder is removed from component 22, 122, mounting arm 12, 112 can be returned to the first (i.e., start) position. Alternatively, mounting arm 12, 112 can be rotated to and locked in other positions along its rotational axis and the pneumatic knocker 14, 114 operated in the additional positions prior to returning to the first position. This may be necessary where the geometry of component 22, 122 is particularly complex, with various cavities open on different sides of the component 22, 122. It is further possible to repeat either/both of steps 204 and 206 as needed, prior to carrying out step 208.

At step 210, build plate 20, 120 and component(s) 22, 122 can be removed from fixture 10, 110. Component(s) 22, 122 can go on to be removed from build plate 20, 120 and can undergo subsequent processing.

The ability to both rotate a component and apply an impact force leads to higher yields in removed powder from than conventional methods. The fixtures are further adaptable to receive variously sized build plates and components.

DISCUSSION OF POSSIBLE EMBODIMENTS

The following are non-exclusive descriptions of possible embodiments of the present invention.

A powder removal fixture includes a mounting arm extending along and rotatable about a mounting arm axis, at least one pneumatic knocker mounted to the mounting arm via a strike plate, and configured to impact the strike plate, and a build plate attachment mechanism disposed on the mount bar, and configured to receive a build plate having an at least partially formed component.

The fixture of the preceding paragraph can optionally include, additionally and/or alternatively, any one or more of the following features, configurations and/or additional components:

In the above fixture, the mounting arm can be rotatable between a first position and a second position.

In any of the above fixtures, the second position can be 180° from the first position.

Any of the above fixtures can further include a locking mechanism configured to maintain the mounting arm in the second position.

In any of the above fixtures, the locking mechanism can further be configured to maintain the mounting arm at a third position between the first position and the second position.

In any of the above fixtures, the at least one pneumatic knocker can be configured to impact the strike plate with a piston.

In any of the above fixtures, the at least one pneumatic knocker can be configured to impact the strike plate with a minimum force of 100 ft-lb.

In any of the above fixtures, the at least one pneumatic knocker can include a first pneumatic knocker and a second pneumatic knocker.

In any of the above fixtures, the build plate attachment mechanism can include a tray, and the tray can be rotatable about a tray axis.

In any of the above fixtures, the tray axis can be orthogonal to the mounting arm axis.

Any of the above fixtures can further include a build plate mounted on the build plate attachment mechanism, and the at least partially formed component on a build surface of the build plate. The at least partially formed component can include an internal cavity.

Any of the above fixtures can further include an amount of loose powder within the internal cavity.

A method of removing loose powder from an additively manufactured component includes attaching a build plate to a mounting arm of a powder removal fixture, the build plate including a build surface with the component formed on the build surface, rotating the mounting arm from a first position to a second position about a mounting arm axis, and impacting a strike plate mounted on the mounting arm with a piston of a pneumatic knocker when the mounting arm is in the second position to dislodge an amount of the loose powder from the component.

The method of the preceding paragraph can optionally include, additionally and/or alternatively, any one or more of the following features, configurations and/or additional components:

The above method can further include: after attaching the build plate to the mounting arm, rotating the build plate about an axis orthogonal to the mounting arm axis to position the component proximate the strike plate.

Any of the above methods can further include: locking the mounting arm in the second position.

Any of the above methods can further include: operating the pneumatic knocker to impact the strike plate with a minimum force of 100 ft-lb.

In any of the above methods, impacting the strike plate with the piston can include repeatedly impacting the strike plate with the piston over a period of time.

Any of the above methods can further include: returning the mounting arm to the first position.

Any of the above methods can further include: rotating and locking the mounting arm in a third position prior to returning the mounting arm to the first position.

Any of the above methods can further include: detaching and removing the build plate from the mounting arm.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A powder removal fixture comprising:
    a mounting arm extending along and rotatable about a mounting arm axis;
    at least one pneumatic knocker mounted to the mounting arm via a strike plate, and configured to impact the strike plate; and
    a build plate attachment mechanism disposed on the mounting arm, and configured to receive a build plate having an at least partially formed component,
    wherein the strike plate is disposed in a first plane;
    wherein the build plate attachment mechanism is disposed in the first plane and on a first side of the strike plate; and
    wherein the pneumatic knocker is disposed on an opposing, second side of the strike plate.

2. The fixture of claim 1, wherein the mounting arm is rotatable between a first position and a second position.

3. The fixture of claim 2, wherein the second position is 180° from the first position.

4. The fixture of claim 2 and further comprising: a locking mechanism configured to maintain the mounting arm in the second position.

5. The fixture of claim 4, wherein the locking mechanism is further configured to maintain the mounting arm at a third position between the first position and the second position.

6. The fixture of claim 1, wherein the at least one pneumatic knocker is configured to impact the strike plate with a piston.

7. The fixture of claim 1, wherein the at least one pneumatic knocker is configured to impact the strike plate with a minimum force of 100 ft-lb.

8. The fixture of claim 1, wherein the at least one pneumatic knocker comprises a first pneumatic knocker and a second pneumatic knocker.

9. The fixture of claim 1, wherein the build plate attachment mechanism comprises a tray, and wherein the tray is rotatable about a tray axis.

10. The fixture of claim 9, wherein the tray axis is orthogonal to the mounting arm axis.

11. The fixture of claim 1 and further comprising:
    a build plate mounted on the build plate attachment mechanism; and
    the at least partially formed component on a build surface of the build plate, the at least partially formed component comprising an internal cavity.

12. The fixture of claim 11 and further comprising: an amount of loose powder within the internal cavity.

13. A method of removing loose powder from an additively manufactured component, the method comprising:
    attaching a build plate to a mounting arm of a powder removal fixture, the build plate comprising a build surface with the component formed on the build surface;
    rotating the mounting arm from a first position to a second position about a mounting arm axis; and
    impacting a strike plate mounted on the mounting arm with a piston of a pneumatic knocker when the mounting arm is in the second position to dislodge an amount of the loose powder from the component,
    wherein the strike plate is disposed in a first plane;
    wherein the build plate is disposed in the first plane and on a first side of the strike plate; and
    wherein the pneumatic knocker is disposed on an opposing, second side of the strike plate.

14. The method of claim 13 and further comprising: after attaching the build plate to the mounting arm, rotating the build plate about an axis orthogonal to the mounting arm axis to position the component proximate the strike plate.

15. The method of claim 13 and further comprising: locking the mounting arm in the second position.

16. The method of claim 15 and further comprising: operating the pneumatic knocker to impact the strike plate with a minimum force of 100 ft-lb.

17. The method of claim 15, wherein impacting the strike plate with the piston comprises repeatedly impacting the strike plate with the piston over a period of time.

18. The method of claim 15 and further comprising: returning the mounting arm to the first position.

19. The method of claim 18 and further comprising: rotating and locking the mounting arm in a third position prior to returning the mounting arm to the first position.

20. The method of claim 18 and further comprising: detaching and removing the build plate from the mounting arm.

* * * * *